United States Patent Office 2,917,778
Patented Dec. 22, 1959

2,917,778

CLOSED VESSEL CURING OF CONCRETE

Luther L. Lyon, Jr., and Ray W. Qualley, Wichita, Kans., assignors to The Coleman Company, Inc., Wichita, Kans., a corporation of Kansas No Drawing. Application December 23, 1955
Serial No. 554,921

3 Claims. (Cl. 18—47.5)

This invention relates to the closed vessel curing of concrete lined vessels.

The lining of vessels with concrete has been carried on for many years and such concrete linings have been found to be particularly useful in connection with water heaters and other vessels. One problem that has persisted is that during the first two or three weeks of use the exit water from the tank has increased hardness, alkalinity, and in some cases produces milky water. Immediate air drying of the concrete lining tends to improve the liner from the standpoint of reducing hardness, alkalinity and milky exit water, but, unfortunately, exposure of the concrete liner to air flow brings about unsatisfactory curing of the concrete, resulting in low strength concrete.

As illustrative of prior art practices in the lining of containers, Ford Patent No. 2,395,731 may be referred to. A more recently developed commercial practice is described in the copending application of Arthur E. Phillips, Serial No. 363,843, filed June 24, 1953.

An object of the present invention is to provide a process in which the concrete liner of a vessel is effectively cured, while at the same time reducing hardness, alkalinity, and milky exit water. A further object is to provide a process in which enough moisture is maintained within the tank to produce good curing of the concrete liner therein even when the tank is closed, as by plugging the tank openings thereof, thus bringing about effective curing of the concrete liner, while reducing alkalinity and hardness, as above described. Other specific objects and advantages will appear as the specification proceeds.

In one embodiment of our invention, we take a vessel which has been freshly lined with concrete by any of the common methods, and introduce into the vessel carbon dioxide in sufficient quantity to neutralize the layer of calcium hydroxide on the surface of the concrete, thereafter sealing the vessel and curing the concrete out of access to outside air. A convenient method of introducing the carbon dioxide is to insert a pellet of Dry Ice into the vessel immediately after the liner is formed and promptly thereafter corking the openings of the vessel so as to provide an air seal. The closed vessel brings about a cure of the concrete under moist conditions, giving time for calcium aluminum silicates to form, and the slow recrystallization thus accomplished produces a sturdy liner for the vessel. At the same time, the atmosphere containing a substantial volume of $CO_2$ produces an insoluble layer on the inside, consisting principally of calcium carbonate, thus reducing hardness, alkalinity and milky exit water.

As a specific example of the embodiment described, the following operation may be set out: The vessel, such as, for example, a water heater shell, which is provided with openings such as an inlet opening and a drain opening and sometimes with inspection openings, is provided with a concrete mixture adapted to form the liner within the vessel. This mixture may consist of Portland cement, said, water, etc., and after the mixture is introduced into the tank, the tank assembly is placed upon a spinning machine and secured in position, the openings being sealed. The tank is then rotated at an r.p.m. which will result in a peripheral speed of, say, 3,000 feet per minute, for 15 seconds, after which time the tank may be vibrated, as by hammering the outside walls of the tank as the tank continues to spin. The rotation of the tank may then be stopped, the plug from the drain opening removed, and the sludge allowed to run off. The plug may then be replaced and the spinning drive started again and the tank hammered or vibrated as it is spinning, the drain plug again removed and the residue drawn of. A Dry Ice pellet, or several pellets, may then be introduced into the tank and the tank sealed so as to exclude air from the interior.

After curing for several days under the moist conditions described, an extremely sturdy concrete liner is produced, in which hardness, alkalinity, and tendency to produce milky exit water is reduced.

The carbon dioxide may be introduced in any suitable form, either as a Dry Ice pellet or as gaseous $CO_2$. For example, combustion gases may be introduced into the tank to supply the desired $CO_2$ content.

The amount of $CO_2$ introduced into the tank will vary under different conditions. It is sufficient that the $CO_2$ present in the tank be enough to neutralize the layer of calcium hydroxide which is on the surface of the concrete. Ordinarily, for a tank having approximately 2100 squares inches of concrete surface, 0.25 cubic feet of $CO_2$ at atmospheric pressure and room temperature is sufficient to bring about such neutralization. On the volume basis, we desire to have the $CO_2$ be at least 15% of the total volume in the tank chamber. Generally, on a surface basis, we find that one cubic foot of $CO_2$ at atmospheric pressure and room temperature is satisfactory for every 40 to 80 square feet of surface. Highly effective results have been attained when one cubic foot of $CO_2$ at atmospheric pressure and room temperature is employed for every 60 square feet of surface. As above stated, however, the amount of $CO_2$ employed will vary with different conditions, and it is necessary only that with the amount of available $CO_2$ within the chamber bring about a neutralization of the calcium hydroxide on the surface of the concrete.

We prefer to introduce the $CO_2$ promptly after the application of the concrete to the surface, and thus at the very beginning of the curing stage. While some delay in the period of application is permissible, we prefer to make the application within a matter of minutes after the spinning or other concrete applying operation is completed, and thereafter we desire to carry on the curing operation in the absence of outside air.

Detailed examples of the process may be set out as follows:

*Example 1*

A water heater tank was lined with concrete to provide an inner concrete surface of about 2100 square inches. A mix containing 22% of Portland cement, 63% of pure sifted sand, and 13% of water, all on a weight basis, was supplied through an opening into the vessel and the tank assembly was placed upon the spinning machine and rotated to give a peripheral speed of 3,000 feet per minute for 15 seconds. After spinning the tank for 15 seconds, the tank was hammered to vibrate the same as it continued to spin. After a short vibration period, the rotation was stopped and the plug from the drain opening removed and the sludge allowed to run off. A new spinning operation was then carried on with further vibrating or hammering, and the spinning then discontinued. The drain plug was again removed and the residue drained off. Two pellets of Dry Ice were then introduced into the interior of the tank, each pellet being about one-half inch in diameter and two inches in length. The openings were then corked so as to cut off access to the atmosphere, and the concrete was then allowed to cure under moist conditions and out of contact with outside air. In this instance, the curing was for 28 days. It was found that the hardness of the liner decreased by a factor of 10 and the alkalinity, as measured by pH, decreased by 2 to 3 pH units, while at the same time a minimum of milky water was produced.

*Example II*

The process was carried on as described in Example I except that 4 pellets of Dry Ice were employed, giving approximately 0.5 cubic feet of carbon dioxide. The results were comparable to those described in Example I.

*Example III*

The process was carried on as described in Example I, except that 6 of the pellets of Dry Ice were used, giving a carbon dioxide content of 0.75 cubic feet. Excellent results were obtained as described in Example I.

*Example IV*

Here, in place of Dry Ice, gaseous $CO_2$ was employed and the use of the introduced gaseous $CO_2$ gave results comparable to those described in Example I.

In addition to the foregoing Examples, $CO_2$ was introduced into the vessels in the form of combustion gases. Good results were obtained.

While the invention is described for simplicity of illustration in connection with a water heater tank, it will be understood that other closed vessels employed for many different purposes may be employed in the carrying out of the process, the long curing of the concrete under moist conditions being carried on to produce an extremely sturdy liner in which the hardness, alkalinity, and tendency to form milky exit water was substantially reduced.

While, in the foregoing specification, we have set forth process steps in considerable detail for the purpose of illustrating embodiments of the process, it will be understood that such details of procedure may be varied widely by those skilled in the art without departing from the spirit of our invention.

We claim:

1. In a process for curing a wet concrete liner within a water tank, the steps of introducing into the tank $CO_2$ in the proportion of one cubic foot of $CO_2$ at atmospheric pressure and room temperature for 40-80 square feet of concrete surface, the said $CO_2$ providing at least about 15% of the atmosphere within the tank, sealing the tank to exclude access of air, and curing the concrete under the moist conditions prevailing in the sealed tank and for a period up to about 28 days.

2. The process of claim 1, in which the proportion of $CO_2$ is about one cubic foot at atmospheric pressure and room temperature for each 60 square feet of concrete surface.

3. In the forming of a concrete lined water heater tank in which a concrete mix is introduced into the tank and the tank sealed and spun to apply the concrete to the walls of the tank, the excess liquid in the tank being then drained off, the steps of introducing solid $CO_2$ in the proportion of one cubic foot at atmospheric pressure and room temperature for each 60 square feet of concrete surface, the said $CO_2$ providing about at least 15% of the atmosphere within said tank, sealing the tank against the ingress of air, and curing the concrete under the moist conditions prevailing in the sealed tank for a period up to about 28 days.

References Cited in the file of this patent

UNITED STATES PATENTS

| | | |
|---|---|---|
| Re. 24,187 | Burwell | July 31, 1956 |
| 898,703 | Thom | Sept. 15, 1908 |
| 1,599,413 | Harrison et al. | Sept. 14, 1926 |
| 2,496,895 | Staley | Feb. 7, 1950 |
| 2,720,469 | Serkin | Oct. 11, 1955 |

OTHER REFERENCES

Grant: "Manufacture of Concrete Units −10," published in Concrete, August 1951, pp. 36–39.